United States Patent
Cornwell et al.

(10) Patent No.: US 7,996,599 B2
(45) Date of Patent: Aug. 9, 2011

(54) COMMAND RESEQUENCING IN MEMORY OPERATIONS

(75) Inventors: Michael J. Cornwell, San Jose, CA (US); Christopher P. Dudte, San Jose, CA (US); Thomas R. Colligan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 366 days.

(21) Appl. No.: 11/739,878

(22) Filed: Apr. 25, 2007

(65) Prior Publication Data

US 2008/0270678 A1    Oct. 30, 2008

(51) Int. Cl.
G06F 13/00    (2006.01)

(52) U.S. Cl. .............. 711/103; 365/185.09; 365/185.33

(58) Field of Classification Search .............. 711/103, 711/154
See application file for complete search history.

(56) References Cited

U.S. PATENT DOCUMENTS

| | | | |
|---|---|---|---|
| 5,509,134 A | 4/1996 | Fandrich et al. | |
| 5,602,987 A | 2/1997 | Harari et al. | |
| 5,638,534 A * | 6/1997 | Mote, Jr. ................... | 711/158 |
| 5,671,229 A | 9/1997 | Harari et al. | |
| 5,719,808 A | 2/1998 | Harari et al. | |
| 6,047,334 A * | 4/2000 | Langendorf et al. ............. | 710/5 |
| 6,112,265 A * | 8/2000 | Harriman et al. ............... | 710/40 |
| 6,149,316 A | 11/2000 | Harari et al. | |
| 6,426,893 B1 | 7/2002 | Conley et al. | |
| 6,684,301 B1 | 1/2004 | Martin | |
| 6,721,820 B2 | 4/2004 | Zilberman et al. | |
| 6,757,842 B2 | 6/2004 | Harari et al. | |
| 6,763,424 B2 | 7/2004 | Conley | |
| 6,914,846 B2 | 7/2005 | Harari et al. | |
| 6,947,332 B2 | 9/2005 | Wallace et al. | |
| 7,128,110 B2 * | 10/2006 | Yamazaki et al. ......... | 152/209.12 |
| 7,137,011 B1 | 11/2006 | Harari et al. | |
| 7,162,569 B2 | 1/2007 | Conley et al. | |
| 7,237,046 B2 | 6/2007 | Paley et al. | |
| 7,237,074 B2 | 6/2007 | Guterman et al. | |
| 7,240,219 B2 | 7/2007 | Teicher et al. | |
| 7,370,331 B2 * | 5/2008 | Brenner ...................... | 718/107 |
| 7,417,637 B1 * | 8/2008 | Donham et al. .............. | 345/506 |
| 2002/0138676 A1 | 9/2002 | Kendall et al. | |
| 2003/0217239 A1 | 11/2003 | Jeddeloh | |
| 2004/0103242 A1 | 5/2004 | Teng | |
| 2004/0225847 A1 | 11/2004 | Wastlick et al. | |
| 2005/0120146 A1 | 6/2005 | Chen et al. | |
| 2006/0112240 A1 | 5/2006 | Walker et al. | |
| 2007/0066119 A1 | 3/2007 | Wu et al. | |

OTHER PUBLICATIONS

Notification of Transmittal of the International Search Report and the Written Opinion of the International Searching Authority of Application No. PCT/US2008/061467 filed Apr. 24, 2008 and mailed Feb. 9, 2009 (18 pages).

International Preliminary Report on Patentability issued in international application No. PCT/US2008/061467, mailed on Nov. 5, 2009, 10 pages.

Communication pursuant to Article 64(3) EPC, dated Nov. 19, 2010, 6 pages.

* cited by examiner

*Primary Examiner* — Hetul Patel (74) *Attorney, Agent, or Firm* — Fish & Richardson P.C.

(57) ABSTRACT

Systems and processes may include a memory coupled to a memory controller. Command signals for performing memory access operations may be received. Attributes of the command signals, such as type, time lapsed since receipt, and relatedness to other command signals, may be determined. Command signals may be sequenced in a sequence of execution based on the attributes. Command signals may be executed in the sequence of execution.

25 Claims, 6 Drawing Sheets

COMMAND RESEQUENCING IN MEMORY OPERATIONS

TECHNICAL FIELD

The present invention relates to managing memory, and more particularly to resequencing commands in memory management.

BACKGROUND

Advanced Technology Attachment (ATA) buses are often used to transmit command signals for memory access operations to a memory controller. Command signals to be executed (e.g., read or write signals) are sent from a host processor across an ATA bus to the memory controller. Conventionally, ATA buses are used to communicate with a memory controller that is integrated on a disk drive. ATA buses can also be used to communicate with a memory controller for other types of memories, such as flash memories. In such a case, the memory controller can translate commands received on the ATA bus into a format suitable for communicating with the flash memory.

SUMMARY

Parallel ATAs generally require command signals to be executed prior to transmitting the next command for execution. Executing the command signals sequentially in the order received may result in inefficiencies. Command signals (e.g., read commands) with low execution times may be held in the queue for execution while waiting for long processes (e.g., write commands) to be completed. Techniques can be implemented for resequencing command signals to increase performance of a memory, decrease memory processing times, and/or increase a life cycle of a memory (e.g., by reducing writes or erases to a block of a memory).

In one general aspect, command signals for performing flash memory access operations are received in a first sequence. One or more attributes of the received command signals are determined, and a second sequence of execution for the command signals is determined at least partially based on at least one of the attributes. The command signals are executed in the second sequence to perform access operations on a flash memory.

Implementations may include one or more of the following features. Command signals may include read commands and/or write commands. The attributes may include an execution time, a command type, and/or a memory address or location associated with the command. Command signals with shorter execution times may be promoted in a sequence of execution over command signals with longer execution times. Read commands may be promoted in the sequence of execution over write commands. It may be determined if two or more of the command signals are related. Related command signals may be positioned sequentially (e.g., consecutively) in the sequence of execution or may be consolidated. Command signals may be received via a serial ATA bus. Attributes may also include time lapsed from receipt of the command signal, and the second sequence may be determined at least partially based on the time lapsed from receipt of the command signal.

In another general aspect, a first sequence of command signals for performing memory access operations is detected. One or more attributes of the command signals are determined, and a second sequence of execution for the command signals is determined at least partially based on at least one of the attributes.

Implementations may include one or more of the following features. One or more of the command signals may be executed in the second sequence of execution. Read commands may be executed over another type of command in the second sequence of execution. Related command signals may be identified and positioned sequentially in the second sequence.

In another general aspect, first memory is operable to store command signals for performing memory access operations on a second memory. A memory controller is operable to execute the stored command signals on the second memory, determine one or more attributes of the command signals, and determine a sequence of execution for the command signals at least partially based on at least one of the attributes.

Implementations may include one or more of the following features. A serial ATA bus may be operable to transmit command signals to the memory controller. The first memory may be a buffer, where the buffer may be coupled to the memory controller. The second memory may include an electrically erasable memory.

The details of one or more implementations are set forth in the accompanying drawings and the description below. Other features will be apparent from the description, the drawings, and from the claims.

DESCRIPTION OF DRAWINGS

Like reference symbols in the various drawings indicate like elements.

DETAILED DESCRIPTION

Figure 1:
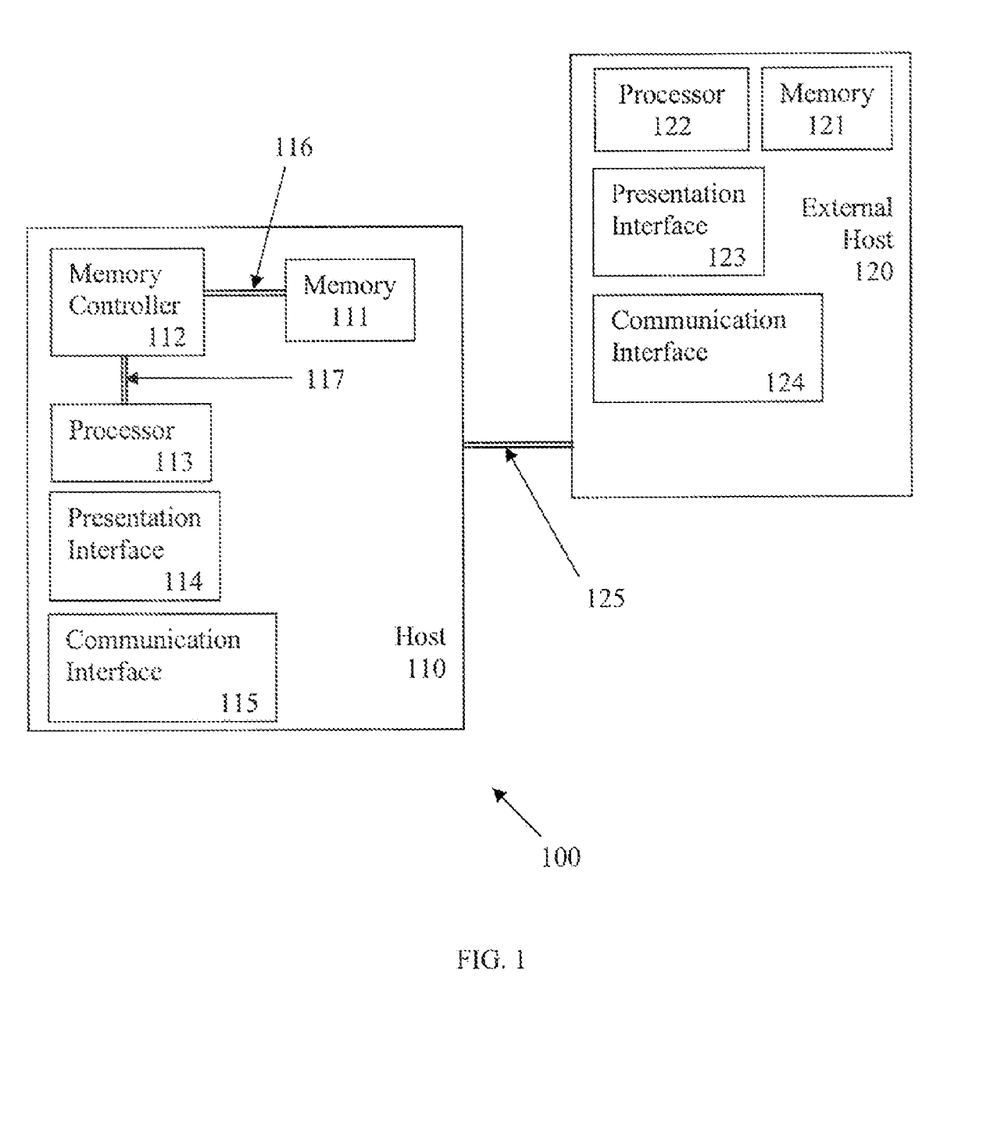
FIG. 1 illustrates an example of a host and an external host.

FIG. 1 illustrates an example system 100. System 100 may include a host 110. Host 110 may be any electronic or computing device that uses nonvolatile memory including, for example, portable and desktop computers, clients, servers, consumer electronics, calculators, network appliances, media players/recorders, game consoles, mobile phones, email devices, personal digital assistants (PDAs), embedded devices, televisions, system-on-chip (SoC), set-top boxes, audio recorders, handheld data collection scanners, and/or monitoring devices. Host 110 may include a memory 111, a memory controller 112, a processor 113, a presentation interface 114, and/or a communication interface 115. Memory controller 112 and/or processor 113 may include individual chips, a chip set, or can be integrated together on a single chip (e.g., a SoC solution).

Memory 111 may be nonvolatile memory, such as read-only memory (ROM), optical memory (e.g., CD, DVD, or LD), magnetic memory (e.g., hard disk drives, floppy disk drives), NAND flash memory, NOR flash memory, electrically-erasable, programmable read-only memory (EEPROM), Ferroelectric random-access memory (FeRAM), magnetoresistive random-access memory (MRAM), non-volatile random-access memory (NVRAM), non-volatile static random-access memory (nvSRAM), phase-change memory (PRAM), and/or any other memory that does not need its memory contents periodically refreshed and/or can retain information without power. Memory 111 may include memory chips or memory modules (e.g., single in-line memory modules (SIMMs) or dual in-line memory modules (DIMMs)). In some implementations, memory 111 may be electrically erasable. Memory 111 may have a finite number of write/erase cycles. For example, after a number of write/erase cycles, the ability of a cell of memory 111 to maintain a specified charge may be impaired. For example, a memory cell may leak electrons. As another example, an electric charge may not be substantially removable from a memory cell. Cells of a nonvolatile memory may not be individually erasable, such as in flash memory. For example, a cell of a block may be erased by erasing the entire block in which the cell resides. Similarly, writing new data to a portion of a block may require erasing the entire block and rewriting any unchanged portions of the block along with the new data.

Figure 2:
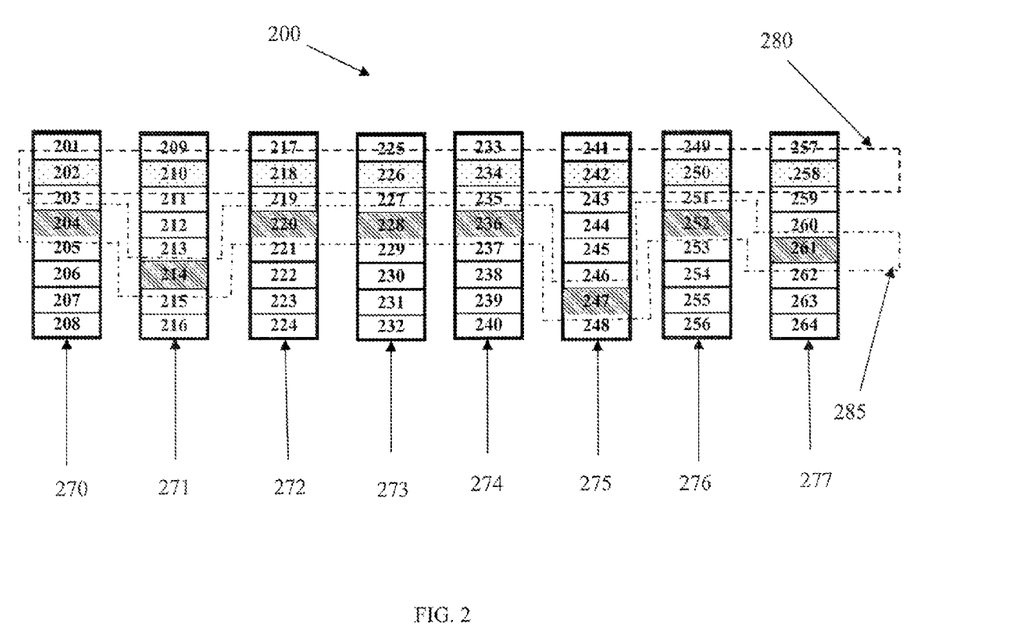
FIG. 2 illustrates an example configuration of a memory.

In some implementations, memory may be interleaved to increase performance of the host. FIG. 2 depicts a representation of a portion of a memory 200. Memory 200 may include physical blocks 270-277. Each physical block 270-277 may include cells 201-264. For example, physical block 270 may include cells 201-208 and physical block 271 may include cells 209-216. The physical blocks 270-277 and cells 201-264 depicted in FIG. 2 are for purposes of illustration and do not represent a typical implementation. For example, in the case of flash memory, physical blocks typically include a much larger number of cells (e.g., sufficient to store 512 or 2048 bytes), which may be divided into pages (e.g., of 64 bytes), although any size of physical blocks and any number of cells can be used.

During operation, memory 111 may receive signals from memory controller 112 over Input/Output (I/O) bus 116, which enables memory 111 to carry out memory access requests (e.g., read or write operations) received by the memory controller 112 from the processor 113 (see FIG. 1). Memory 111 may be interleaved, so that read or write requests to logical block addresses 280 and 285 (LBAs) are mapped to physical memory addresses that include two or more physical blocks 270-277 (see FIGS. 1 and 2). Interleaving may increase performance (e.g., by decreasing read and/or write times by allowing multiple parallel reads or writes) or protecting against lost data (e.g., by providing some degree of redundancy across different physical blocks) of memory 111. Host 110 (e.g., using processor 113) may perform reads and writes to LBAs 280, 285, which are mapped or translated (e.g., by memory controller 112) to physical block addresses 270-277 of memory. For example, LBA 280 includes cells 202, 210, 218, 226, 234, 242, 250, and 258 and LBA 285 includes cells 204, 214, 220, 228, 236, 247, 252, and 261. In some situations, mapping may help make a memory appear similar to a hard disk drive to the host (e.g., to the operating system of the processor).

In some implementations, physical blocks may be mapped to virtual blocks. Virtual blocks may make a memory appear continuous. For example, bad blocks may be omitted from a virtual block listing. Virtual blocks may be mapped to LBAs to increase memory performance by allowing interleaving.

Memory controller 112 may be any device that manages memory access including, for example, programmable memory controllers, flash disk controllers, direct memory access (DMA) controllers, logic devices, field-programmable gate arrays (FPGAs), and/or central processing units (CPUs). Examples of memory controller 112 may include the family of ATA Flash Disk Controllers (e.g., device nos. SST55LD019A, SST55LD019B, SST55LD019C, etc.), manufactured by Silicon Storage Technology, Inc. (Sunnyvale, Calif.). In some implementations, memory controller 104 supports single-level cell (SLC) and/or multi-level cell (MLC) flash media.

In some implementations, memory controller 112 may recognize control, address, and/or data signals transmitted on bus 117 by processor 113. Memory controller 112 may translate the control, address, and/or data signals into memory access requests on memory 111. Bus 117 may be an Integrated Drive Electronics (IDE)/Advanced Technology Attachment (ATA) bus that transfers control, address and data signals using IDE/ATA standard bus protocol (e.g., ATA-6 bus protocol). IDE/ATA signals may be generated by processor 113 and translated by the memory controller 112 into memory access requests in a format or protocol appropriate for communicating with the memory 111 across bus 116.

Processor 113 may include a programmable logic device, a microprocessor, or any other appropriate device for manipulating information in a logical manner. A processor may execute the operating system for the host. An example of processor 113 is a PP5002 SuperIntegration™ SoC controller manufactured by PortalPlayer, Inc. (San Jose, Calif.). The PP5002 controller may provide a platform for media player/recorder systems and/or other products that use non-volatile memory.

During use, an application running on processor 113 may request access to data stored on memory 111, see FIG. 1. For example, a user of a host 110 (e.g., a media player/recorder) or an external host 120 (e.g., a desktop or laptop computer) connected to the host 110 may submit a request to save a song to memory 111. A media player/recorder application may send the request to an operating system running on the processor 113, which formats the request into IDE/ATA signals. IDE/ATA signals may be transmitted to memory controller 112 on bus 117 by processor 113. Memory controller 112 may translate the request to access memory 111 via bus 116.

In some implementations, processor 113 may include memory controller 112. For example, the processor 113 and memory controller 112 may be an integrated processor unit. Processors with integrated memory controllers may be commercially available from Freescale Semiconductor (Austin, Tex.) and Texas Instruments (Dallas, Tex.).

Presentation interface 114 may present data such as videos, music, messages from the host 105 and/or external host 120, graphical interface for various applications stored on the host (e.g., graphical interface for playing music, videos, manipulating data, etc). For example, presentation interface 114 may present data in visual and/or audio format. Presentation interface 114 may include a display device, such as a screen, and/or speakers. Presentation interface may include a graphical interface.

Communication interface 115 may allow communication with other devices. Communication interface 115 may transmit data from host 110 to, and/or receive data from, external host 120 via network protocols (e.g., TCP/IP, Bluetooth, and/or Wi-Fi) and/or a bus (e.g., serial, parallel, USB, and/or FireWire).

Figure 3:
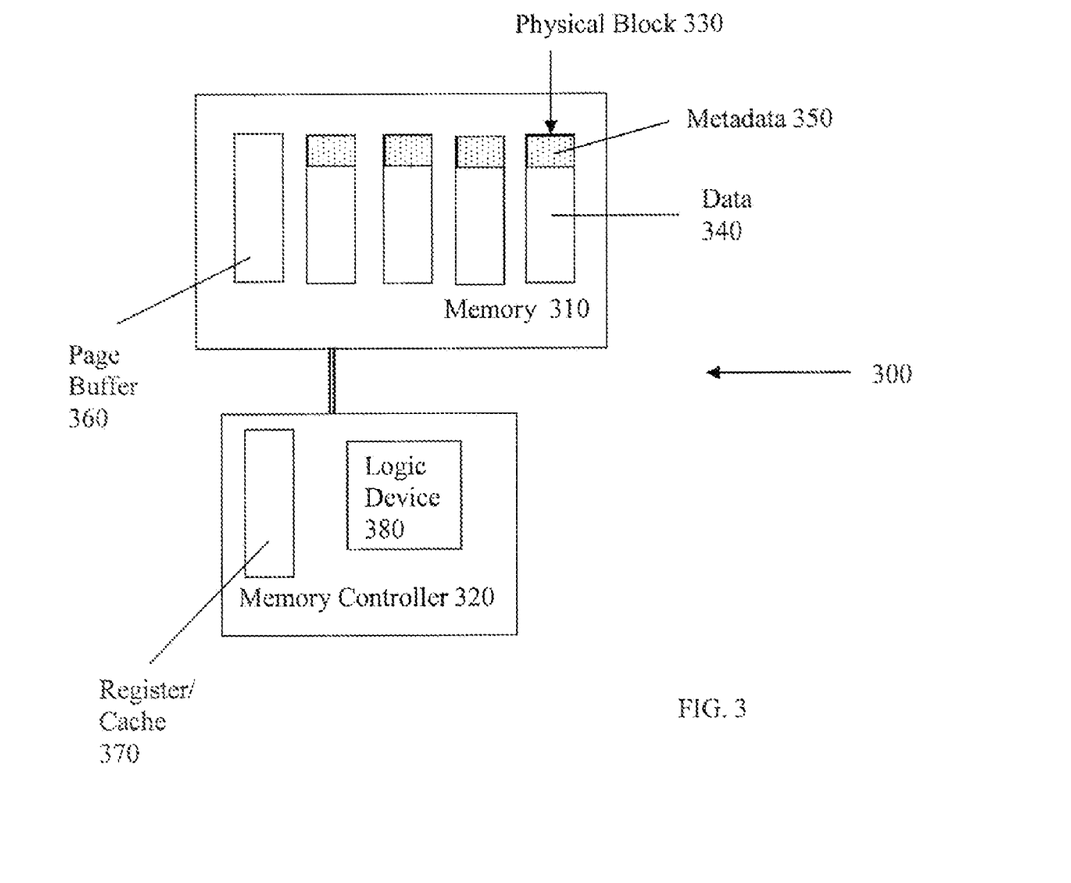
FIG. 3 illustrates an example of a memory controller coupled to a memory.

FIG. 3 illustrates a portion 300 of a host including a memory 310 and a memory controller 320. Memory 310 may include physical blocks 330 that store data 340 or are capable of storing data. A portion of a physical block 330 may store metadata 350. Metadata may include information about other data in the memory, such as listings of bad blocks in a memory or error correcting codes. Memory 310 may include a first buffer 360 (e.g., a page buffer) that is used to temporarily store data as it is being written to or read from the blocks 330. Memory controller 320 may include or be coupled to a second buffer 370 (e.g., a register or a cache). Second buffer 370 may be a volatile memory such as RAM or a nonvolatile memory such as flash memory.

Memory controller 320 may include a logic device 380 that interprets operations from a host or external host and/or performs operations on a coupled memory. Memory controller 320 operations may include use of at least two buffers 360 and 370 to facilitate operations (e.g., read or write), facilitate random data access operations, and/or increase performance. For example, memory controller 320 may read data from memory 310. In response to a read request from memory controller 320, data from data portion 340 of memory 310 may be loaded into first buffer 360 (e.g., data register or page register). The data in the first buffer 360 may be transmitted to second buffer 370 (e.g., cache, register, or cache register) which is coupled to memory controller 320. The second buffer 370 may accumulate multiple pages of data from the first buffer. Memory controller 320 may reformat data from second buffer 370 for delivery to processor 113 of the host 110 (see FIG. 1) (e.g., in IDE/ATA format). While or after data is transferred from first buffer 360 to second buffer 370, additional data may be loaded from data portions 340 of memory 310 to the first buffer 360.

Memory controller 320 may also input data received from a host or external host into second buffer 370 (e.g., cache) for programming of the array through first buffer 360.

The memory controller 320 may receive requests to read and/or write data to memory 310. The memory controller 320 may format the requests to an instruction format appropriate for the memory 310 (e.g., from or to TDE/ATA format). The memory controller 320 may then transfer the instructions in the appropriate format to the memory 310. The requests in the memory 310 may then be converted to the appropriate electrical charges or the appropriate portions of the memory may be transferred to the second buffer.

Although the above description discusses portions of each block as being for data and/or for metadata, portions of a block that are used for data or metadata may not be fixed. A particular portion of a block may include metadata at some times and include user data or other data at other times.

Host 110 may be coupled to an external host 120, as illustrated in FIG. 1, to transmit and/or receive data. For example, songs and/or videos may be downloaded from external host 120 (e.g., computer) to host 110, which may be a media player or other portable device. As another example, applications, such as firmware, operating systems, software for playing MP3s, software for playing videos and/or upgrades, updates, and/or modifications to applications (e.g., change in available features such as playlists) may be downloaded from external host 120 to host 110. Furthermore, data from the host 110 may be uploaded to external host 120. In addition, host 110 may be coupled to external host 120 to modify data on memory 111 of the host and/or memory 121 of the external host. Host 110 may be coupled to external host 120 to initiate and/or execute processes on the host.

Host 110 may be temporarily coupled to external host. For example, host 110 may be coupled to external host 120 using a connector 125 (e.g., serial bus, parallel bus, USB, and/or FireWire). Connector 125 may be an electrical connector. Connector 125 may allow a removable connection between host 110 and external host 120. A temporary coupling between host 110 and external host 120 may allow the host, such as a portable device, to be disconnected from the external host and/or physically moved away from the external host.

Host 110 may be wirelessly coupled to external host 120. Data may be transmitted using one or more network protocols (e.g., TCP/IP, Wi-Fi, 802.11g, 802.11n, IR or Bluetooth).

External host 120 may be any electronic or computing device including, for example, portable and desktop computers, clients, servers, consumer electronics, network appliances, etc. An external host 120 may include a memory 121, a processor 122, a presentation interface 123, and/or a communication interface 124.

Memory 121 may be a volatile memory (e.g., RAM) and/or nonvolatile memory (disk drive, flash memory, or other suitable memories). Processor 122 may be a programmable logic device, a microprocessor, or any other appropriate device for manipulating information in a logical manner. Presentation interface 123 may present data. Communication interface 124 may allow communication with other devices, such as host 110.

Figure 4:
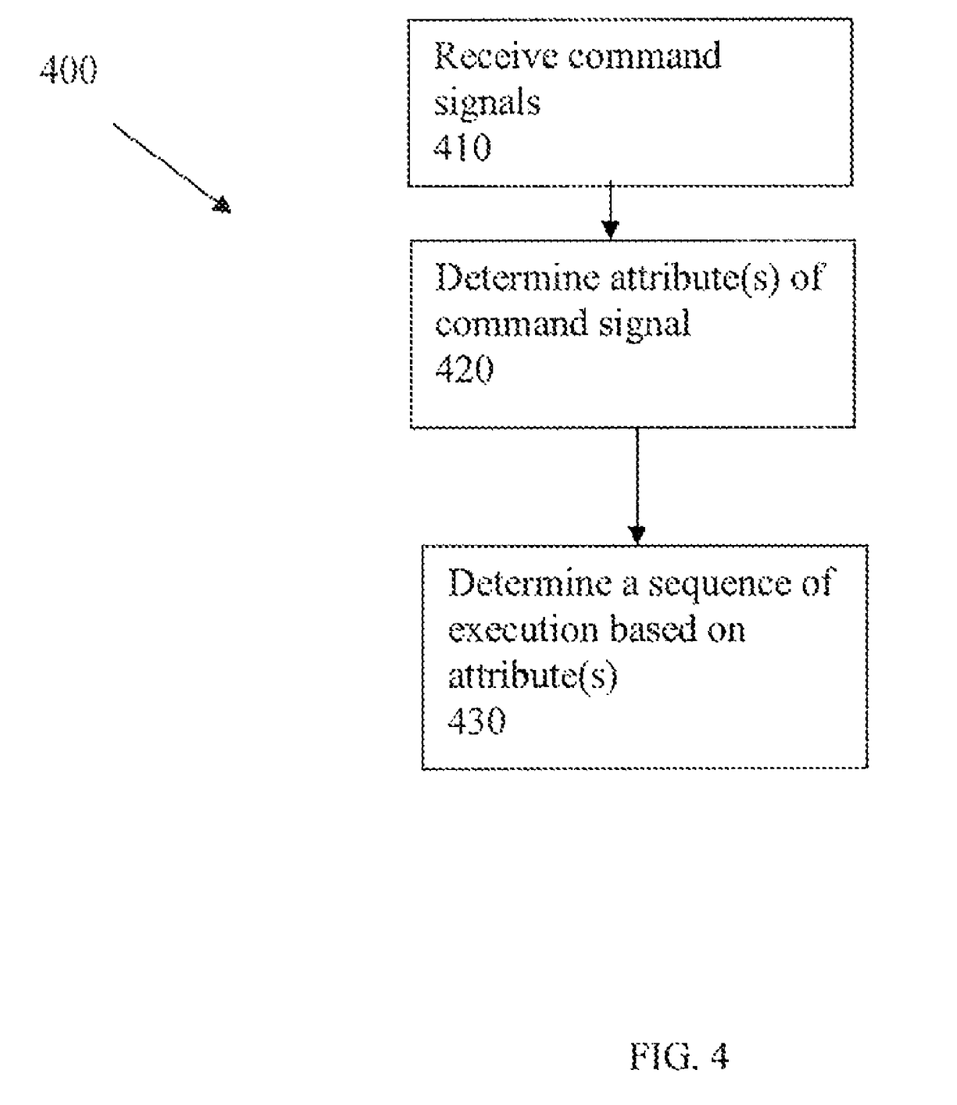
FIG. 4 illustrates an example process of a host.

FIG. 4 illustrates a process 400 for reordering memory access operations of a host. Command signals for performing memory access operations may be received (operation 410). For example, command signals may include read, write, and/or erase commands. Command signals may be received in a first sequence. Command signals may be received from other devices in the host, from a user, and/or from an external host.

A serial ATA bus may couple the memory controller to the processor of the host. One or more serial ATA buses may couple the processor to other devices in the host and/or external host. Command signals may be received by a memory controller via a serial ATA bus. A serial ATA bus may be used rather than some forms of parallel ATA and USB buses to allow command sequencing. Parallel ATA and USB buses may not allow command resequencing and/or require a command to be executed prior to transmitting another command. Serial ATA bus may allow, for example, 32 commands to be transmitted to a memory controller of a host. Command signals may be received by other connections that allow resequencing of command signals received (e.g., command signals may not need to be executed prior to receiving other command signals).

Attribute(s) of the command signals may be determined (operation 420). Attributes may include characteristics of the command signals. For example, attributes may include the type of command (e.g., read, write, or erase), the approximate amount of time needed to execute the command, the task the command is performing (e.g., wear leveling or playing media in a specified order), an amount of time lapsed since the command was received, and/or whether the command signal is related to other command signals (e.g., related tasks or write, read, and/or erase the same blocks and/or cells).

A sequence of execution may be determined based on attribute(s) of the command signals (operation 430). Commands may be continuously transmitted to the memory controller as they are generated and/or as register space on the memory controller allows. A sequence of execution may be determined periodically or continuously. For example, a memory controller may continuously sequence command signals received. As another example, a memory controller may sequence command signals and execute at least a portion of the command signals in the sequence of execution prior to resequencing the command signals.

Command resequencing may reduce the need to copy and rewrite data, which may increase the lifetime of a memory (e.g., memories with finite write/erase cycles such as flash memories).

Figure 5:
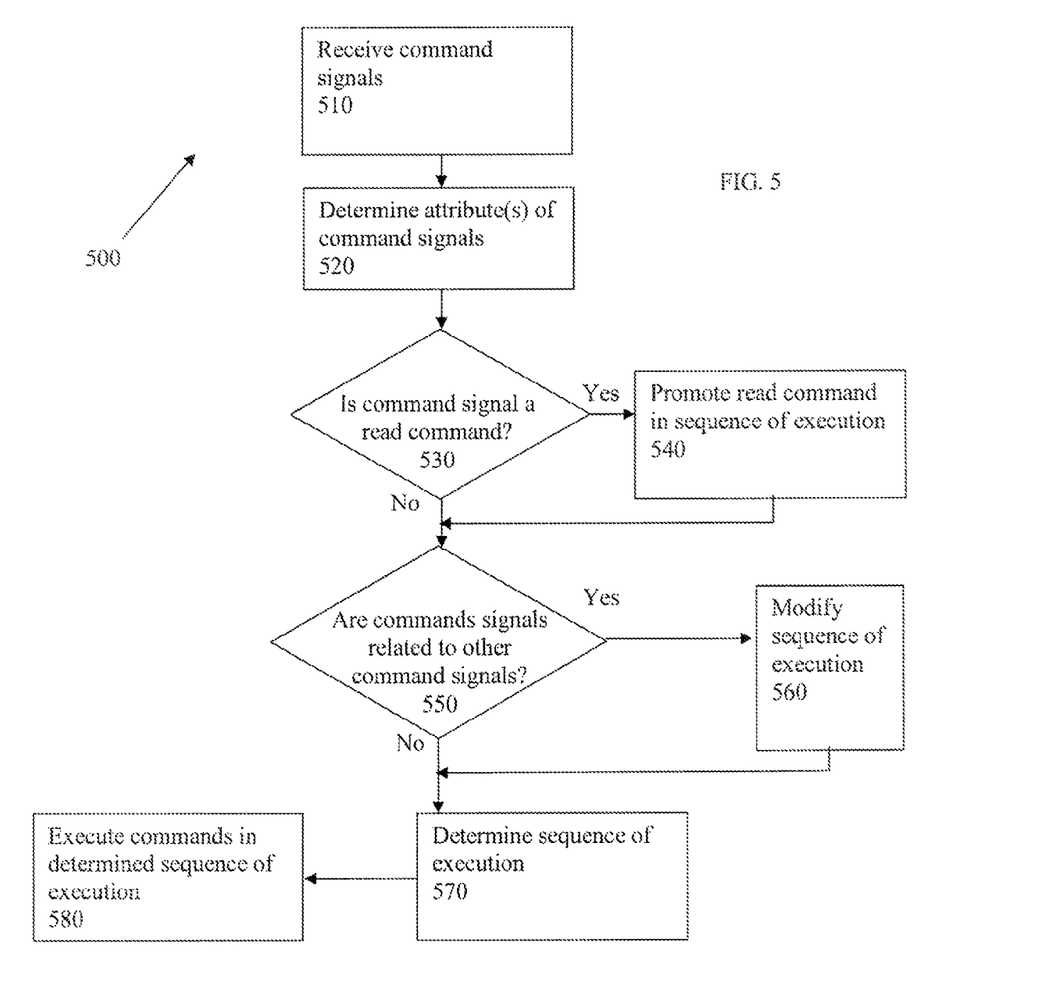
FIG. 5 illustrates an example process of resequencing command signals.

FIG. 5 illustrates an example of a process 500 for resequencing command signals. Command signals may be received (operation 510). For example, a processor or a memory controller of the host may receive command signals for performing memory access operations on a memory (e.g., nonvolatile memory, such as flash memory) of the host. Command signals may be stored in a second buffer of the system (e.g., cache). The sequence in which command signals are received may be determined.

Attribute(s) for command signals may be determined (operation 520). For example, time elapsed from receipt of a command signal may be determined. Whether the command signal is a read, a write, or an erase command may be determined. In addition or as an alternative, an execution time for a command signal may be determined. A command signal may include metadata that indicates attributes of the command signal. For example, metadata associated with the command signal may indicate attributes of the command signal. In some implementations, the memory controller may determine attributes of the command.

The command signals may then be sequenced in a sequence of execution based on the determined attribute(s). A determination may be made whether the command signal is a read command (operation 530). For example, the memory controller may determine whether the command signal is a read command. If the command signal is a read command, the read command may be promoted in the sequence of execution (operation 540). Read commands may be promoted over other command signals. In some implementations, read commands may have low execution times and thus promotion in the sequence allows the memory controller to quickly execute some of the command signals.

A determination may be made whether command(s) are related to other command signals (operation 550). Related command signals may include command signals that relate to a similar task or operation (e.g., multi-step operations). Related command signals may include command signals that write, read, and/or erase the same or related blocks and/or cells of data. A processor or a memory controller of the host may determine whether command signals are related. Metadata associated with the command signals may indicate whether the command signals are related.

If command signals are related, the sequence of execution may be modified (operation 560). For example, related command signals may be positioned sequentially (e.g., consecutively) in the sequence of execution. As another example, some command signals may be merged or deleted. The need to move data (e.g., data copying and block erasing in order to write data to a cell) may be reduced by analyzing commands received. For example, commands that act on the same cells and/or blocks may be merged, deleted, and/or resequenced to reduce the need to move data. Reducing the need to move data may extend the life of a memory by reducing the number of erase/write cycles.

As an example, two sets of commands may involve replacing data in first and third cells of a block. The first set of commands to replace data in a first cell may include: a first command to copy data from cells in a block other than first cell to a log block, a second command to erase the block, a third command to write the new data in the first block, a fourth command to write the copied data into the block. A second set of commands to replace data in the third cell may include: a fifth command to copy data from the cells of the block other than the third cell to a log block, a sixth command to erase the block, a seventh command to write the new data for the third cell in the block, an eighth command to write data copied from the block to the block. Memory controller may merge the first and the fifth commands to copy the cells in the block other than the first and the third cells. Memory controller may merge the second and the sixth commands to erase the block of the cells. The resulting set of commands may include: copying cells of the block other than the first and the third cells, erasing the block, writing the new data to the first cell, writing the new data to the third cell, and writing the data copied from the block back to the block. The resulting sets of commands may reduce the number of commands for a memory controller to execute and increase the life cycle of the memory by merging erase cycles. In some implementations, the write commands to the first and the third cells may also be merged with commands for rewriting unchanged data (e.g., cells other than the first and the third cells) so that one write command may be executed after erasing the block of the memory.

Conflict resolution between commands may be performed by the memory controller and/or the algorithm used to resequence commands. For example, a read command may read new data written by another command. When resequencing the commands, even if read commands are generally promoted over other commands, since a read command may be dependent on the new data being written, the read command may be sequenced after the write command. As another example, commands that have longer execution times may be sequenced lower in the sequence of execution than some other types of more quickly executing commands. However, if one of the more quickly executing commands depends on the result of one of the longer execution time commands, then the longer execution time command may be promoted in the sequence such that the quickly executing commands may be executed. As an example, if a read command depends on a write command, the write command may be promoted in the sequence of execution and/or the write command and the read command may be promoted and the read command may be positioned sequentially after the write command.

In some implementations, a command signal may be promoted after a specified period of time lapses from receipt of the command signal. When command signals are resequenced to promote read commands and/or promote command signals with short execution times, other command signals may be demoted in the sequence of execution. To inhibit command signals from residing without execution in the cache for an indefinite or prolonged period, the attribute of time lapsed from receipt may be used to promote command signals in the sequence of execution.

The sequence of execution may then be determined (operation 570). For example, after analyzing the attributes of the command signals, the sequence may be determined based on the attribute(s).

Command signals may then be executed in the determined sequence of execution (operation 580). For example, the memory controller may execute the command signals in the sequence of execution. In some implementations, one or more of the command signals in the sequence of execution may not be executed in the determined sequence. For example, the sequence of execution may be resequenced as new command signals are received and the command signals may be executed according to the new sequence. As another example, a specified number of command signals may be executed prior to resequencing the sequence of execution.

In some implementations, an algorithm may be used to determine the sequence in which commands may be executed. The algorithm may assign various weights and/or priorities to attributes when sequencing commands, which may balance promoting reads and command aging in the queue. An algorithm can assign points to different attributes of a command (e.g., type, whether it has related commands, time in queue), and the commands may be sequenced according to the number of points assigned. For example, a command may receive 5 points for being a read command, 1 point for being a write command, and 0.1 times the number of milliseconds the command has been in the queue. If two commands exist in the queue, a newly received read command and a write command that has resided in the queue for 45 milliseconds, then the read command may be assigned 5 points and the write command may be assigned 5.5 points and thus the write command may be sequenced ahead of the read command.

Figure 6A:
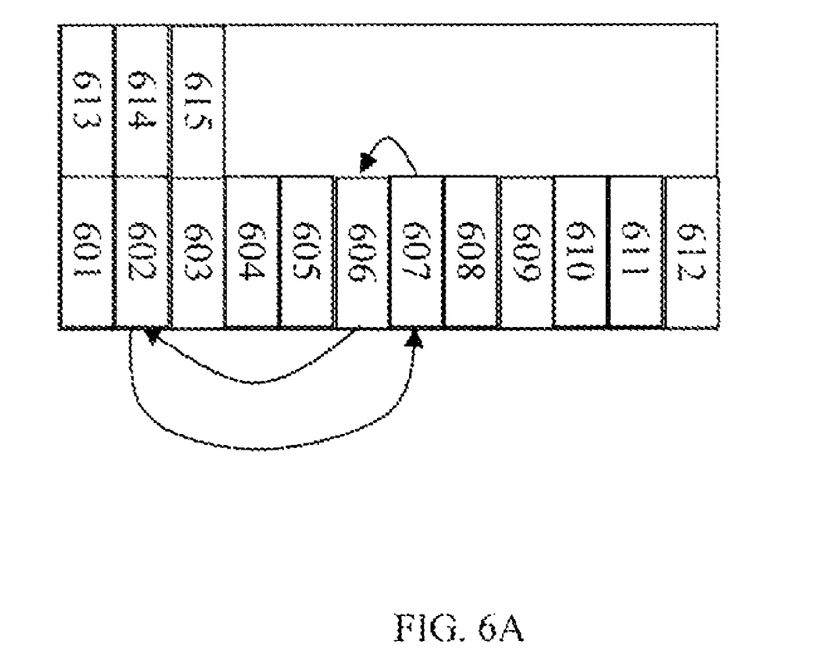
FIGS. 6A-6B illustrates an example resequencing of command signals
Figure 6B:
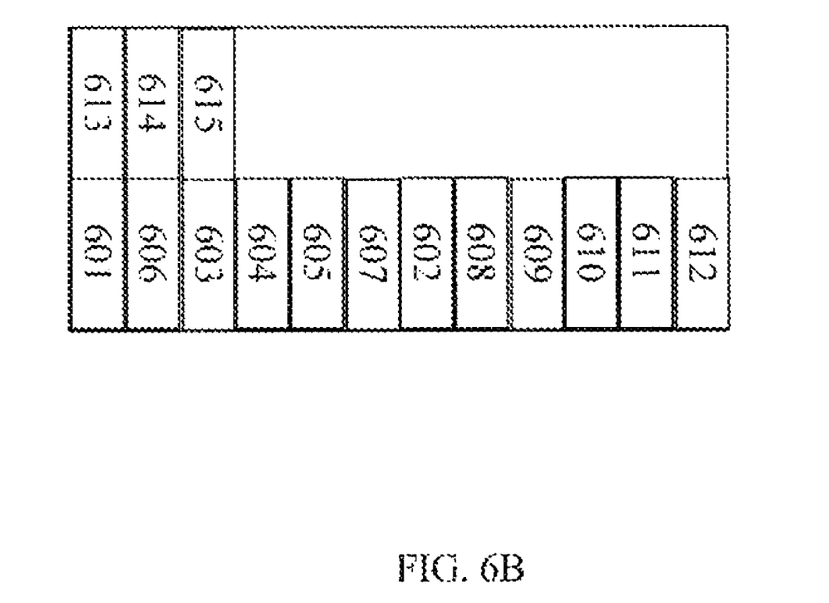

FIGS. 6A-B illustrates an example of resequencing command signals. FIG. 6A illustrates command signals 601-615 received by a first memory (e.g., cache) of a host. A first memory may be coupled to a memory controller for a second memory. Command signals for memory access operations on a second memory of the host may be received in a first sequence. Attribute(s) of the command signals may be determined. Command signals may then be resequenced in a second sequence, as illustrated in FIG. 6B, at least partially based on the attribute(s). For example, command 606 may be a read command and promoted over non-read commands (e.g., command signals 603-605). Command 602 may be a write command related to command signals 608-610 and thus positioned sequentially with the related command signals.

Although a user has been described as a human, a user may be a person, a group of people, a person or persons interacting with one or more computers, and/or a computer system, as appropriate.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer (e.g., host or external host) having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to interact with a user as well. For example, feedback provided to the user by an output device may be any form of sensory feedback (e.g., visual feedback, auditory feedback, and/or tactile feedback) and/or input from the user may be received in any form, including acoustic, speech, or tactile input.

The systems and techniques described here can be implemented in a computing system that includes a back end component (e.g., as a data server), a middleware component (e.g., an application server), a front end component (e.g., a client computer with a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system may include clients and servers. A client and a server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made. For example, a processor of the host may retrieve command signals from stacks of command signals associated with other devices (e.g., applications, drives, LCDs) of the host and/or the external host. As another example, metadata associated with command signals may be analyzed to determine attribute(s) of command signals. Among other modifications, the described operations may be performed in a different order than is described and some operations may be added or deleted. For example, related command signals may not be positioned sequentially in the sequence of execution. As another example, read commands may not be promoted over other types of command signals in the sequence of execution. Furthermore, command signals may be positioned in the sequence of execution at least partially based on execution time(s). Accordingly, other implementations are within the scope of this application.

It is to be understood the implementations are not limited to particular systems or processes described. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a processor" includes a combination of two or more processors and reference to "a memory" includes mixtures of different types of memories.

What is claimed is:

1. A method for managing memory comprising:
receiving command signals for performing flash memory access operations in a first sequence of execution, each of said command signals include an erase command and at least one of a read command and a write command;
determining one or more attributes of the command signals;
determining an association of the read command and the write command based, at least in part, on the one or more attributes of the subset of the command signals;
determining the write command precedes the read command in the first sequence of execution;
promoting the read command in the first sequence of execution to a position subsequent the write command;
determining a first command signal replaces data in a first cell of a same block in the flash memory and a second command signal replaces data in a second cell of the same block, the first cell different from the second cell, the first command signal includes a first command configured to erase the same block, the second command signal includes a second command configured to erase the same block;

merging the first command and the second command to generate a combined command signal that replaces data in both the first cell and the second cell, the combined command signal reduces a number of times the same block is erased by including a single command configured to erase the same block;

generating a second sequence of execution including the promoted read command and the combined command, the second sequence of execution including less commands than the first sequence of execution; and executing the second sequence to perform access operations on a flash memory.

2. The method of claim 1, wherein the write command includes a first write command, further comprising promoting the read command from the first sequence over at least a second write command for the second sequence.

3. The method of claim 1, wherein at least one of the attributes includes an execution time.

4. The method of claim 3 further comprising promoting a command signal with a shorter execution time over a command signal with a longer execution time for the second sequence.

5. The method of claim 1, further comprising positioning the subset of the command signals sequentially in the second sequence of execution.

6. The method of claim 5 further comprising consolidating one or more of the subset of the command signals.

7. The method of claim 5 wherein the association is based on the subset of the command signals operating on a same block of a memory.

8. The method of claim 5 wherein the association is based on the subset of the command signals executing a same task.

9. The method of claim 1, wherein receiving command signals comprises receiving command signals via a serial ATA bus.

10. The method of claim 1, wherein at least one of the attributes includes time lapsed from receipt of a command signal, and wherein the second sequence may be determined at least partially based on the time lapsed from receipt of the command signal.

11. The method of claim 1, wherein the read command and the write command are executed sequentially.

12. An article comprising a non-transitory medium storing instructions for memory management, the instructions operable to cause data processing apparatus to perform operations comprising:

detecting a first sequence of command signals for performing memory access operations on electrically erasable memory, each of said command signals include an erase command and at least one of a read command and a write command;

determining one or more attributes of one or more of the command signals;

determining whether an association exists between a particular read command and a write command that precedes the read command in the first sequence of execution based, at least in part, on the one or more attributes of the subset of the command signals;

if an association does not exist between the particular read command and any write commands that precede the read command in the first sequence of execution, promoting the read command to a position preceding the one or more write commands;

if an association does exist between the particular read command and a particular write command that precedes the read command in the first sequence of execution, promoting the read command in the first sequence of execution to a position subsequent the particular write command to generate a second sequence of execution for the command signals;

determining a first command signal replaces data in a first cell of a same block in the flash memory and a second command signal replaces data in a second cell of the same block, the first cell different from the second cell, the first command signal includes a first command configured to erase the same block, the second command signal includes a second command configured to erase the same block;

merging the first command and the second command to generate a combined command signal that replaces data in both the first cell and the second cell, the combined command signal reduces a number of times the same block is erased by including single command configured to erase the same block; and generating a second sequence of execution including any promoted read command and the combined command, the second sequence of execution including less commands than the first sequence of execution.

13. The article of claim 12, wherein the instructions are further operable to cause data processing apparatus to perform operations comprising executing one or more of the command signals in the second sequence of execution.

14. The article of claim 12, wherein the instructions are further operable to cause data processing apparatus to perform operations comprising positioning the subset of the command signals sequentially in the second sequence.

15. The article of claim 12, wherein the instructions are further operable to cause data processing apparatus to perform operations comprising:

modifying at least one command in the subset of the command signals based on the determined association.

16. The article of claim 12, wherein the instructions are further operable to cause data processing apparatus to perform operations comprising:

resolving a conflict between the subset of the command signals, if a conflict between two or more of the command signals in the subset exists.

17. The article of claim 12, wherein at least one of the attributes of one or more of the command signals includes time elapsed since receipt of a command signal, and wherein the second sequence of execution for one or more of the command signals is determined at least partially based on time elapsed since receipt of the command signal.

18. A system comprising:

a first memory operable to store command signals for performing flash memory access operations on a second memory;

a memory controller operable to:

execute one or more of the command signals on the second memory in accordance with a first sequence, each of said command signals include an erase command and at least one of a read command and a write command;

determine one or more attributes of the command signals;

determine whether an association exists between a particular read command and a write command that precedes the read command in the first sequence of execution based, at least in part, on the one or more attributes;

if an association does not exist between the particular read command and any write commands that precede the read command in the first sequence of execution, promote the read command in the first sequence of execution to a position preceding the one or more write commands to generate a second sequence of execution;

if an association does exist between the particular read command and a particular write command that precedes the read command in the first sequence of execution, avoid promoting the read command to a position preceding the particular write command;

determine a first command signal replaces data in a first cell of a same block in the flash memory and a second command signal replaces data in a second cell of the same block, the first cell different from the second cell, the first command signal includes a first command configured to erase the same block, the second command signal includes a second command configured to erase the same block;

merge the first command and the second command to generate a combined command signal that replaces data in both the first cell and the second cell, the combined command signal reduces a number of times the same block is erased by including a single command configured to erase the same block; and generate a second sequence of execution including the promoted read command and the combined command, the second sequence of execution including less commands than the first sequence of execution.

19. The system of claim 18, further comprising a serial ATA bus operable to transmit command signals to the memory controller.

20. The system of claim 18, wherein the first memory includes a buffer.

21. The system of claim 18, wherein the second memory comprises an electrically erasable memory.

22. The system of claim 18, further comprising an algorithm configured to assign weights to command signals based on determined attributes and determine the sequence of execution for one or more of the command signals based on the assigned weights, and wherein the memory controller is configured to execute the algorithm.

23. The system of claim 18, wherein, if an association does exist between the particular read command and the particular write command that precedes the read command in the first sequence of execution, the memory controller is further operable to promote the read command in the first sequence of execution to a position subsequent the write command to generate a second sequence of execution for the command signals.

24. The system of claim 23, wherein the particular write command and the particular read command are positioned in the second sequence of execution to execute sequentially.

25. A system comprising:

a non-transitory means for receiving command signals for performing flash memory access operations in a first sequence of execution, each of said command signals include an erase command and at least one of a read command and a write command;

a non-transitory means for determining one or more attributes of the command signals; a non-transitory means for determining an association of the read command and the write command based, at least in part, on the one or more attributes of the subset of the command signals;

a non-transitory means for determining the write command precedes the read command in the first sequence of execution;

a non-transitory means for promoting the read command in the first sequence of execution to a position subsequent the write command;

a non-transitory means for determining a first command signal replaces data in a first cell of a same block in the flash memory and a second command signal replaces data in a second cell of the same block, the first cell different from the second cell, the first command signal includes a first command configured to erase the same block, the second command signal includes a second command configured to erase the same block;

a non-transitory means for merging the first command and the second command to generate a combined command signal that replaces data in both the first cell and the second cell, the combined command signal reduces a number of times the same block is erased by including a single command configured to erase the same block; and a non-transitory means for generating a second sequence of execution including the promoted read command and the combined command, the second sequence of execution including less commands than the first sequence of execution, the read command and the write command execute sequentially.

* * * * *